UNITED STATES PATENT OFFICE.

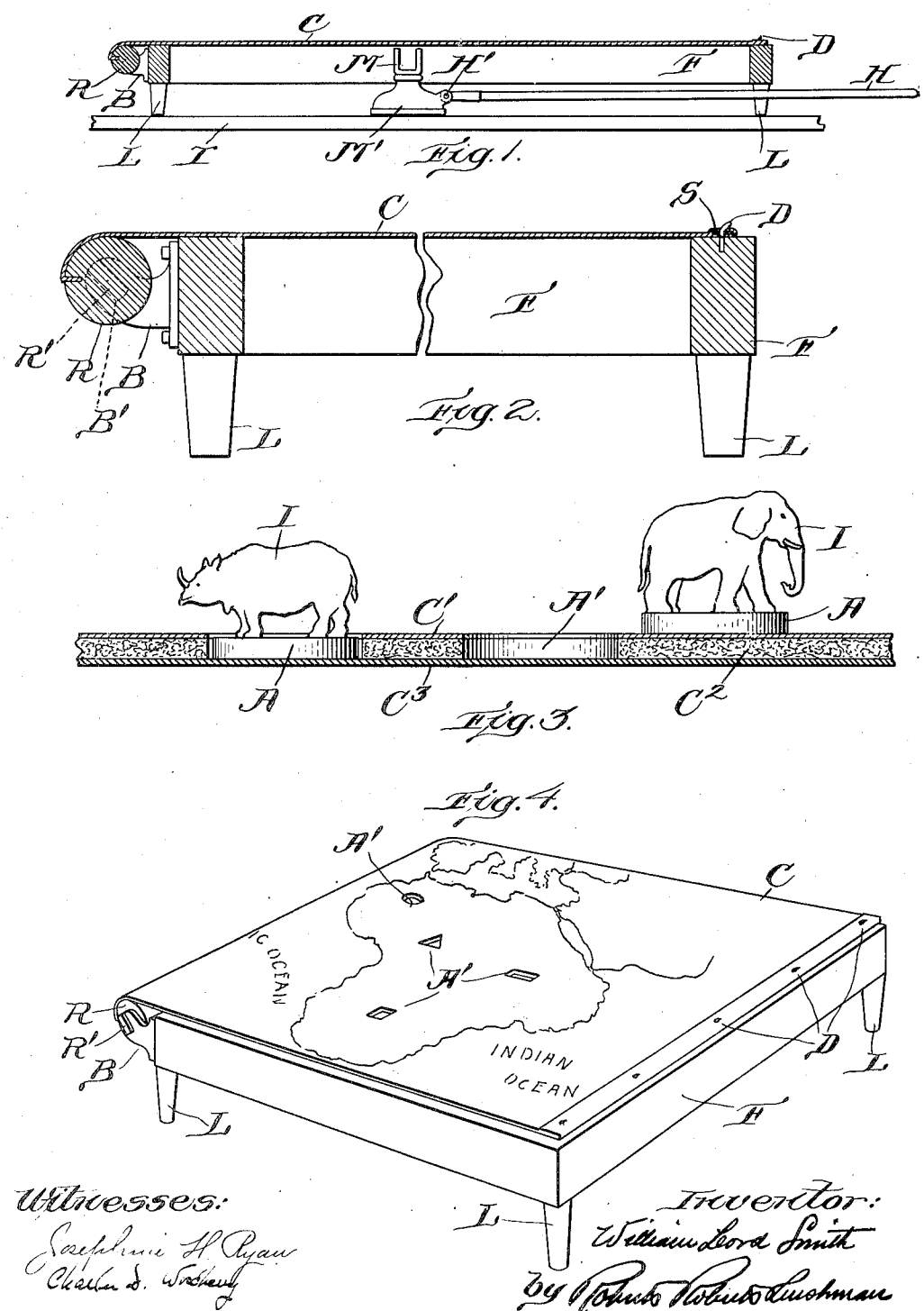

WILLIAM LORD SMITH, OF BOSTON, MASSACHUSETTS.

EDUCATIONAL APPARATUS.

1,084,370.  Specification of Letters Patent.  Patented Jan. 13, 1914.

Application filed April 4, 1913. Serial No. 758,744.

*To all whom it may concern:*

Be it known that I, WILLIAM LORD SMITH, a citizen of the United States, and resident of Boston, in the county of Suffolk and State of Massachusetts, have invented new and useful Improvements in Educational Apparatus, of which the following is a specification.

My invention relates to educational apparatus and consists in improvements on apparatus of the kind shown and described in Letters Patent of the United States No. 706,463, granted to me August 5, 1902.

The objects of my invention will be made clear by the following specification and the drawings hereto annexed which illustrate the same, in which—

Figure 1 is a vertical section of the education apparatus; Fig. 2 is a vertical section on a larger scale showing the mode of mounting and attaching the flexible sheet which forms part of the apparatus; Fig. 3 is a cross section of a portion of the said sheet on still larger scale; and Fig. 4 is a perspective view of the apparatus as a whole.

In the educational apparatus shown in my patent above mentioned, the transparent sheet of glass laid over a map or other illustration sheet, is employed as a surface on which small movable armatures are moved and guided by the movement of a magnet situated below the illustration sheet. The employment of such educational apparatus may involve the movement and arrangement of armatures according to the nature of the topic which is being studied by the aid of the apparatus. Each armature with its appropriate index word, figure or image is therefore intended to arrive at an appropriate destination on the top of the sheet and to be left there temporarily. When a continuous glass surface such as shown in my said patent is employed for this purpose, it not infrequently occurs that an armature placed in its destined place is accidentally displaced therefrom by the movement of the magnet which brings its effective field near enough to the previously placed armature as to displace it. The improvements herein described obviate this difficulty, and moreover, provide an apparatus which is simpler to arrange and to manipulate.

Referring to Fig. 1, F represents an open rectangular frame provided with legs L which rest upon a table T. The illustration sheet generally designated by C, has a reinforcing strip S at one edge, this strip being perforated so as to slip over the retaining pegs or hooks D which are arranged along one side of the frame F. The illustration sheet may be rolled for storage upon cylindrical rollers R to which one edge of the illustration sheet is secured. The sheet is of such size that when its reinforcing strip S is anchored to the hooks D, the sheet will be stretched tight over the frame F when the projections R' secured at each end of the roller R are slipped into the slot B' of the brackets B which are fastened to the frame F. The illustration sheet C is provided at appropriate positions on its surface with recesses shown at A' in Fig. 3. These recesses may be of several different contours as indicated in Fig. 4, in which, however, the recesses are shown for purposes of illustration of much larger relative size than they would preferably have in relation to the illustration sheet C.

A satisfactory mode of constructing the illustration sheet is indicated in Fig. 3. That portion C' on which the illustration, such as a map, is depicted, is glued to a relatively thick sheet C² which may be composed of felt which possesses convenient elasticity and at the back or bottom of this felt sheet C² there is secured by an adhesive a thin but strong cloth backing C³. The recesses A' are cut at appropriate places and pass through the members C' and C² so that the backing C³ is left imperforate and provides bottoms for the recesses A'. The armatures A are of such size and contour as to be accommodated by similarly shaped recesses A' in such manner that when the armature is lodged in a recess it is held therein and cannot be dislodged even though the operating magnet M be moved directly beneath it. The magnet M is secured to a sliding block M' which is manipulated by a handle H pivoted at H' to the block.

For illustration, suppose that the educational apparatus is arranged to depict a map of a geographical division and that it is desired to show on that map a distribution of animals native to the depicted geographical division; or distribution of human races thereon; or the names of geographical sub-divisions or topical features; or it may be two or more of such distributions. The recesses A' may be made of various contours. Recesses for the reception of armatures on which are displayed either the names of animals, or better, a miniature image of the animals themselves, may be made circular and the armatures correspondingly circular, while recesses to accommodate armatures whereon geographical names are printed may be square, etc. The armatures of various shapes and carrying different classifications of subject matter are placed on the margin of the illustration sheet by the pupil being instructed who then manipulates the magnet M so as to move the armature to an appropriate recess, being instructed to place the armature in a recess which properly corresponds with, say the habitat of the animal illustrated by the image carried by the armature. Armatures carrying geographical names may be similarly guided to appropriately shaped recesses, and in all cases when an armature has reached the recess which is its destination it drops therein and cannot be disturbed thereby by the magnet.

I claim:

1. In an educational apparatus, a sheet provided with recesses in its surface, means to mount said sheet to permit movement of a magnet thereunder, armatures which said recesses accommodate, adapted to be moved over the sheet in obedience to movements of a magnet thereunder, the magnet, and means to move it.

2. In an educational apparatus, a sheet provided with recesses of various contour in its surface, means to mount said sheet to permit movement of a magnet thereunder, armatures of various contours which the recesses accommodate, respectively, and selectively, said armatures adapted to be moved over the sheet in obedience to movements of a magnet thereunder, the magnet, and means to move it.

Signed by me at Boston, Massachusetts, this first day of April, 1913.

WILLIAM LORD SMITH.

Witnesses:
 ODIN ROBERTS,
 JOSEPHINE H. RYAN.